(12) United States Patent
Serra

(10) Patent No.: US 6,774,865 B1
(45) Date of Patent: Aug. 10, 2004

(54) PORTABLE ELECTRONIC DEVICE COMPRISING SEVERAL CONTACT-FREE INTEGRATED CIRCUITS

(75) Inventor: Didier Serra, Septeme les Vallons (FR)

(73) Assignee: Inside Technologies, Saint Clement les Places (FR)

( * ) Notice: Subject to any disclaimer, the term of this patent is extended or adjusted under 35 U.S.C. 154(b) by 0 days.

(21) Appl. No.: 10/338,339

(22) Filed: Jan. 8, 2003

Related U.S. Application Data

(63) Continuation of application No. PCT/FR01/02149, filed on Jul. 5, 2001.

(30) Foreign Application Priority Data

Jul. 28, 2000 (FR) .............................................. 00 09997

(51) Int. Cl.[7] ................................................ H01Q 1/36
(52) U.S. Cl. ................................ 343/895; 343/700 MS
(58) Field of Search .......................... 343/895, 700 MS, 343/728, 867, 872; 340/572

(56) References Cited

U.S. PATENT DOCUMENTS

| | | | |
|---|---|---|---|
| 5,461,385 A | | 10/1995 | Armstrong .................... 342/42 |
| 5,574,470 A | * | 11/1996 | de Vall ........................ 343/895 |
| 5,719,586 A | | 2/1998 | Tuttle .......................... 343/726 |
| 6,104,278 A | * | 8/2000 | Altwasser ................. 340/572.1 |
| 6,127,989 A | * | 10/2000 | Kunz .......................... 343/895 |
| 6,154,137 A | * | 11/2000 | Goff et al. ................ 340/572.4 |

FOREIGN PATENT DOCUMENTS

| | | |
|---|---|---|
| EP | 0 101 125 A1 | 2/1984 |
| WO | WO 97/42578 A1 | 11/1997 |
| WO | WO 98/02840 A1 | 1/1998 |
| WO | WO 98/02980 A1 | 1/1998 |
| WO | WO 98/05123 A1 | 2/1998 |
| WO | WO 98/06056 A1 | 2/1998 |
| WO | WO 98/06057 A1 | 2/1998 |
| WO | WO 00/01013 A1 | 1/2000 |

\* cited by examiner

*Primary Examiner*—Hoang V. Nguyen
(74) *Attorney, Agent, or Firm*—Akin Gump Strauss Hauer & Feld, L.L.P.

(57) ABSTRACT

The present invention relates to a device (40) comprising a combination of at least two contactless integrated circuits (45), each integrated circuit being connected to an individual antenna coil (46) to send and/or receive data by inductive coupling. According to the present invention, the device comprises a collective antenna coil (42) that is larger in size than the individual antenna coils of the integrated circuits, and means (41) for arranging the individual antenna coil of an integrated circuit proximate to the collective antenna coil, at least when data are to be read and/or written in the integrated circuit, so that the individual antenna coil of the integrated circuit is inductively coupled to the collective antenna coil. Application to smart cards, electronic badges or electronic labels.

9 Claims, 3 Drawing Sheets

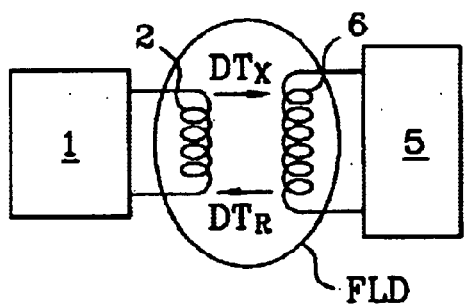
Fig. 1
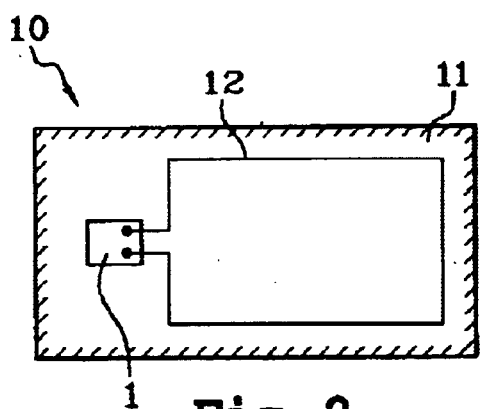
Fig. 2
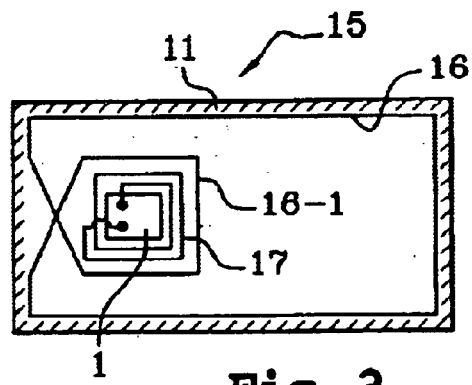
Fig. 3
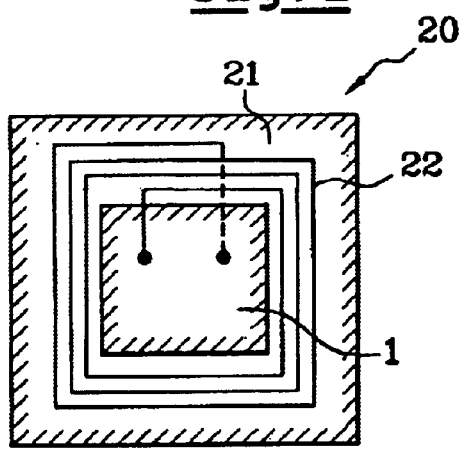
Fig. 4
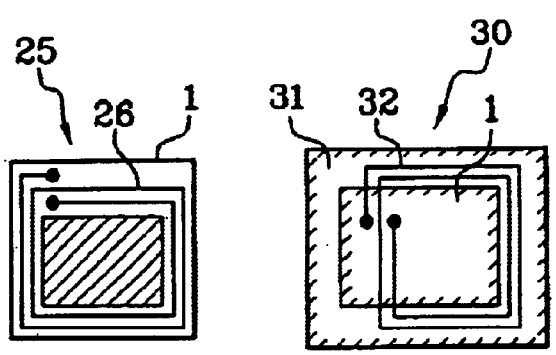
Fig. 5   Fig. 6
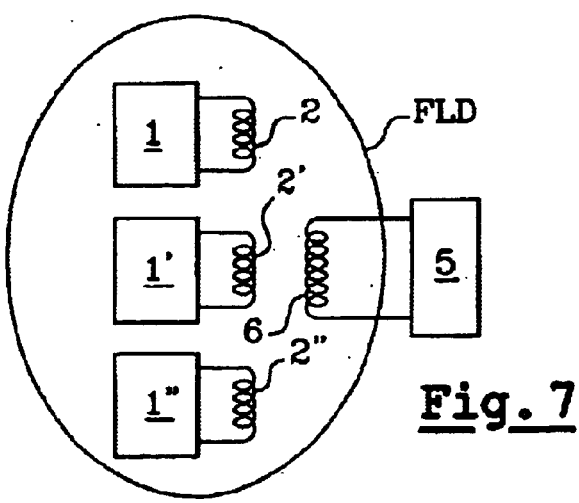
Fig. 7

PORTABLE ELECTRONIC DEVICE COMPRISING SEVERAL CONTACT-FREE INTEGRATED CIRCUITS

CROSS-REFERENCE TO RELATED APPLICATIONS

This application is a continuation of International Application No. PCT/FR01/02149, filed Jul. 5, 2001, the disclosure of which is incorporated herein by reference.

BACKGROUND OF THE INVENTION

The present invention relates to contactless integrated circuits and portable electronic devices produced by means of these integrated circuits.

In recent years, so-called "contactless" integrated circuits have been developed and devised, that are capable of receiving or transmitting data by inductive coupling, through an antenna coil. Examples of embodiments of these integrated circuits are described in applications WO 98/02840, WO 98/02980, WO 98/05123, WO 98/06057 and WO 98/06056 in the name of the applicant. Furthermore, these integrated circuits are being standardized and are more particularly the subject of the draft standard ISO 14443, mentioned herein without restriction.

FIG. 1 is a very schematic representation of a contactless integrated circuit 1 connected to an antenna coil 2. The integrated circuit 1 is active when coil 2 is dipped into a magnetic field FLD sent by a data send/receive station 5 which itself comprises, for that purpose, an antenna coil 6. The magnetic field FLD sent by the station 5 oscillates at a determined frequency, such as 13.56 MHz for example, according to ISO 14443 standard. Generally speaking, data transmission DTr from the station 5 to the integrated circuit 1 is carried out by modulating the amplitude of the antenna signal, with a 100% (ISO 14443/A) or 10% (ISO 14443/B) depth of modulation for example. Data transmission DTx from the integrated circuit 1 to the station 5 is carried out by modulating the coil 2 load. The load modulation signal is passed on by inductive coupling in the coil 6 of the station 2 wherein it is filtered and decoded to retrieve the data DTx that it contains.

These integrated circuits are found in numerous applications and enable more particularly contactless smart cards, contactless electronic badges, contactless electronic labels, etc. to be produced.

One idea, which represents in itself one aspect of the present invention, is to produce a portable electronic device comprising a combination of contactless integrated circuits.

Indeed, the present invention is based on the consideration according to which a combination of several contactless integrated circuits is capable of offering various advantages and to be used in various applications, as demonstrated below.

However, in order to be advantageous, a device comprising several contactless integrated circuits must be compact and offer a maximum distance of communication with each of the integrated circuits which is not too short. "Maximum distance of communication" shall mean the distance of communication above which no data transmission is possible, due to too low inductive coupling.

Yet, a simple juxtaposition of contactless integrated circuits each equipped with an antenna coil does not enable a satisfactory compromise to be found between minimum overall dimensions of the device and a satisfactory maximum distance of communication, pursuant to the principle according to which the maximum distance of communication increases in proportion to the size of the antenna coil. Thus, the juxtaposition of several small micromodules incorporating a contactless integrated circuit and an antenna small in size leads to produce a device the size of which is satisfactory, but wherein each micromodule offers a short maximum distance of communication. Conversely, the juxtaposition of several modules each incorporating a contactless integrated circuit and an antenna of large diameter leads to produce a device offering a satisfactory maximum distance of communication but having considerable overall dimensions and a significant cost price due to the cost of manufacturing each antenna and of the raw material used.

BRIEF SUMMARY OF THE INVENTION

Thus, the present invention aims to provide a device comprising a combination of contactless integrated circuits which have reduced overall dimensions while offering a satisfactory maximum distance of communication.

This object is achieved by providing a device comprising a combination of at least two contactless integrated circuits, each integrated circuit being connected to an individual antenna coil to send and/or receive data by inductive coupling, the device comprising a collective antenna coil that is larger in size than the individual antenna coils of the integrated circuits, and means for arranging the individual coil of an integrated circuit proximate to the collective coil, at least when data are to be read and/or written in the integrated circuit, so that the individual coil of the integrated circuit is inductively coupled to the collective coil, the integrated circuits being arranged or programmed to implement an anti-collision protocol which enables a data send and/or receive station to select one, and only one, integrated circuit during communication with the device.

According to one embodiment, the individual coil of each integrated circuit is permanently coupled to the collective coil.

According to one embodiment, the collective coil, the integrated circuits and the individual antenna coils are arranged on a common support, the integrated circuits and the individual antenna coils being placed in the centre of the collective coil.

According to one embodiment, the collective coil is arranged on a first support, the integrated circuits are arranged on one or more supports which are different from the first support, the device comprising means for moving the support of an integrated circuit closer to the support of the collective coil at least when data are to be read and/or written in the integrated circuit.

According to one embodiment, the collective coil and the integrated circuits are arranged on substantially flat supports structured around an axis so as to form a sort of notebook.

According to one embodiment, the flat supports are jackets.

According to one embodiment, each integrated circuit and its individual antenna coil are produced in the form of a small micromodule.

According to one embodiment, the integrated circuits are arranged or programmed to form together an equivalent integrated circuit the total data storage capacity of which is greater than the individual storage capacity of each integrated circuit.

According to one embodiment, each integrated circuit comprises a datum in its memory representing the rank of the integrated circuit with regard to the other integrated circuits of the device, with a view to adding the data storage capacities of the integrated circuits by adding storage areas.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 1 described above is a schematic representation of a contactless integrated circuit and a data send/receive station, FIG. 2 is a schematic representation of a classical, contactless smart card of a first type, FIG. 3 is a schematic representation of a classical, contactless smart card of a second type, FIG. 4 represents a classical, contactless electronic micromodule of a first type, FIG. 5 represents a classical, contactless electronic micromodule of a second type, FIG. 6 represents a classical, contactless electronic micromodule of a third type, FIG. 7 represents a classical arrangement of contactless integrated circuits wherein the implementation of an anti-collision method is required.

DETAILED DESCRIPTION OF THE INVENTION

Figure 8:
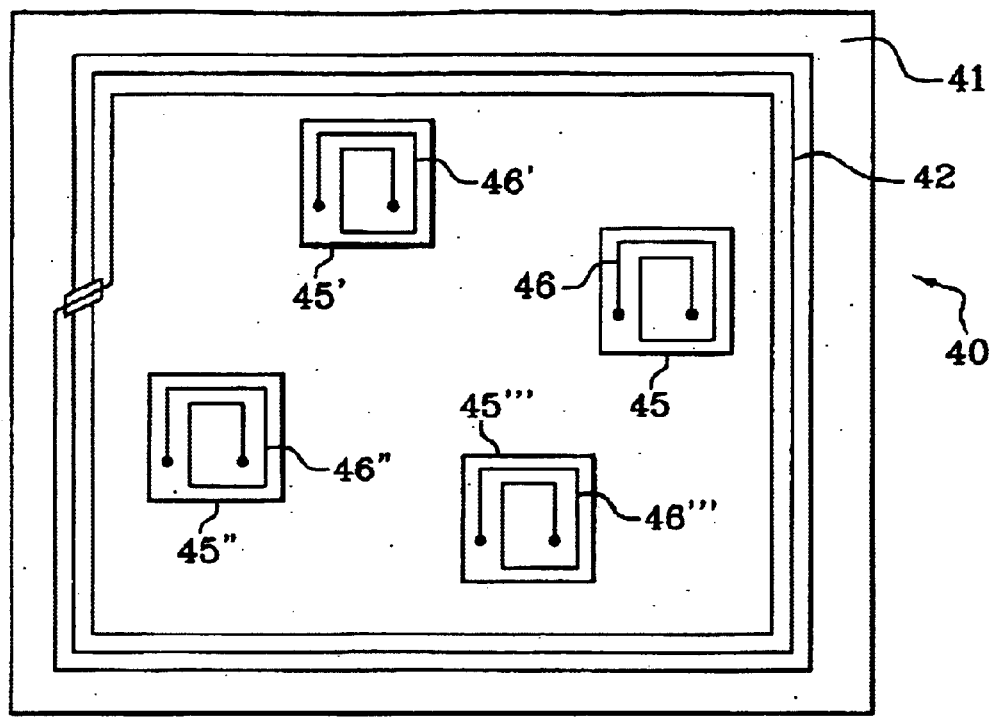
FIG. 8 represents a first example of an embodiment of a device according to the present invention.

Reminders of classical production techniques for contactless electronic modules

As indicated in the preamble, the simple juxtaposition of a set of contactless integrated circuits each equipped with an antenna coil, does not enable a satisfactory compromise to be found between minimum overall dimensions and a satisfactory distance of communication with each of the integrated circuits.

FIGS. 2 to 6 represent various classical embodiments of contactless electronic modules, and illustrate the technical problem that the present invention aims to resolve. FIGS. 2 and 3 represent contactless modules of the smart card type having an extensive maximum distance of communication, which can reach several tens of centimeters, but with considerable overall dimensions. FIGS. 4 to 6 represent contactless micromodules with small overall dimensions, but offering a reduced maximum distance of communication, in the order of one millimeter to a few centimeters according to the micromodule considered.

In the present application, the values of maximum distance of communication mentioned are only relative and are based on experimental findings made under normal conditions of inductive coupling, particularly power consumption by the antenna of a data send/receive station in the order of a few Watts.

Module 10 represented in FIG. 2 is a contactless smart card or an electronic badge made up of a rectangular plastic support 11 on which (or wherein) a contactless integrated circuit 1 and its antenna coil 12 are arranged. The coil 12 travels through the periphery of the support 11 in one or more turns and offers a substantial maximum distance of communication, in the order of about ten centimeters to some tens of centimeters, and even to one or two meters with a powerful reader.

FIG. 3 is a variation 15 of the contactless card in FIG. 2 which differs from the latter in that the support 11 comprises a larger antenna coil 16, which is equivalent to the coil 12 in FIG. 2, and a small antenna coil 17. The integrated circuit 1 and the small coil 17 are arranged in the centre of the coil 16, the coil 17 being connected to the integrated circuit 1, whereas the large coil 16 is in closed loop, its two extremities being connected together. The large coil 16 and the small coil 17 are inductively coupled and the large coil 16 forms a sort of passive relay amplifier for the small coil 17. The inductive coupling between both coils is reinforced by providing a turn 16-1 of the large coil 16 which surrounds the small coil 17 at a short distance from the latter.

A contactless smart card produced in accordance with FIG. 3 is deemed to be less costly to manufacture than the contactless smart card represented in FIG. 2, as there is no electrical contact to be implemented between the large coil 16 and the integrated circuit 1 when manufacturing the card. The integrated circuit 1 and the small coil 17 may be produced in the form of an integrated micromodule, according to collective manufacturing techniques the implementation of which is not costly.

The micromodule 20 in FIG. 4 comprises an epoxy or ceramic support wafer 21 that is smaller than the plastic support described above and which carries a contactless integrated circuit 1 and an antenna coil 22. The coil 22 closely surrounds the silicon wafer of the integrated circuit 1 and the surface of the assembly can be reduced to a few square centimeters. The overall dimensions of the micromodule 20 are clearly less than those of a smart card but the maximum distance of communication offered is shorter, in the order of one centimeter to a few centimeters.

The micromodule 25 in FIG. 5 is produced according to the so-called "coil on chip" technique and is exclusively made up of the silicon wafer of the integrated circuit 1, a coil 26 being directly formed on the silicon wafer by plating. The active area of the wafer, which comprises the electronic components of the integrated circuit, is represented by a hatched area. This active area may be arranged in the center of the coil 26, as represented, or be completely covered with the coil 26. This type of micromodule represents, at the present time, the highest degree of integration of a contactless integrated circuit and its associated coil but offers a maximum distance of communication that is very short, in the order of one millimeter to a few millimeters.

The micromodule 30 represented in FIG. 6, as described in the international application WO 00/01013 in the name of the applicant, is a compromise between the two previously mentioned micromodules. The micromodule 30 comprises a support wafer 31, made of silicon for example, on which the contactless integrated circuit 1 is arranged. The integrated circuit 1 is buried in an insulating layer (not visible on the Figure), made of polyimide for example, on which a coil 32 is arranged, and openings are made in the insulating layer to ensure an electrical contact between the integrated circuit and the coil. The micromodule 30 has larger overall dimensions than the one in FIG. 5 but clearly less than the one in FIG. 4. As the support 31 offers a surface for arranging the coil which is larger than that of the wafer of the integrated circuit 1, the size of the coil 32 can be chosen larger and the maximum distance of communication obtained can be in the order of that of the micromodule in FIG. 4, for overall dimensions which are smaller.

In fact, the juxtaposition of modules of the type represented in FIGS. 2 and 3 leads to produce a device offering a substantial maximum distance of communication but presenting large overall dimensions and a high cost price. Conversely, the juxtaposition of micromodules of the type represented in FIGS. 4 to 6 leads to produce a device with small overall dimensions but offering a short maximum distance of communication.

General aspects of the present invention

The present invention is based on the simple, but no less inventive, idea according to which the amplification technique of the inductive coupling by means of an antenna coil arranged in closed loop, as illustrated in FIG. 3, is applicable to the production of a device comprising several integrated circuits and their individual antenna coils, the amplifier passive coil being used, in this case, as a collective antenna. As indicated in FIG. 3, there is, indeed, in the centre of the coil substantial room that can be used to receive other integrated circuits and their individual coils.

Another idea of the present invention, which goes hand in hand with the first one, is to provide means for managing collisions between messages in each integrated circuit. These collisions will inevitably occur since contactless integrated circuits sharing the same collective antenna coil will be simultaneously activated by the magnetic field sent by a data send/receive station.

Yet, the methods for managing the collisions are in themselves classical methods in the field of contactless electronic labels and may be applied to the present invention. For memory, FIG. 7 illustrates a classical case of collision between three contactless integrated circuits 1, 1', 1" each fitted with an antenna coil 2, 2', 2" and located simultaneously in the interrogation field FLD sent by a data send and/or receive station 5. One, and only one, integrated circuit must be selected by the station 5 and the others must go into standby mode for the duration of the communication. For that purpose, various methods called "anti-collision" methods may be used, particularly the one described by ISO 14443 standard or in the international application WO 97/42578 in the name of the applicant. This anti-collision method includes for example sending a general interrogation message to the integrated circuits, and selecting the integrated circuit that has answered first. The integrated circuits are arranged in order to, upon receiving an interrogation message, determine a random response position on a response time scale, send a response message when the response position has been reached or go into standby mode when a message is received before the response position has been reached.

Examples of production of devices according to the present invention

FIG. 8 represents a device according to the present invention 40, comprising a support 41 on which (or wherein) a collective coil 42 arranged in closed loop is arranged (is incorporated). The support 41 is made of plastic, epoxy or ceramic for example, and the collective coil 42 is made of copper, aluminium or by means of electrically conductive ink.

Various contactless micromodules, here four micromodules 45, 45', 45", 45''', are arranged in the centre of the collective coil 42. The "centre of the collective coil" is an area that is demarcated by the smallest winding in diameter of the collective coil. The micromodules 45, represented in a simplified manner, each comprise a contactless integrated circuit and an individual antenna coil 46, 46', 46", 46''' that is small in size. The micromodules are produced according to any known manufacturing technique, particularly one of the techniques previously described in relation with FIGS. 4, 5 and 6. Thus, for example, a micromodule 45 produced in accordance with micromodule 25 in FIG. 5 is a simple silicon chip on which a coil has previously been formed. Each micromodule 45 implements a data transmission protocol incorporating an anti-collision method of the type described above.

The antenna coil 46 of each micromodule 45 is inductively coupled to the collective coil 42 due to the arrangement of the micromodules in the centre of the collective coil 42. The maximum distance of communication with each micromodule 45 is satisfactory and is in the order of ten times the maximum distance of communication that each micromodule would have in the absence of the collective coil 42.

It will be understood that the device 40 is susceptible of various variations, particularly as far as the shape of the support and of the collective antenna is concerned, as well as their constituent materials. In particular, the collective coil 42 may have various windings with small diameters in its centre which surround the micromodules 45, just like winding 16-1 represented in FIG. 3.

The device 40 is also susceptible of various applications. In one application, the device 40 is used as an electronic label for the identification of goods, each integrated circuit being assigned to the storage of a determined type of information. Assuming that the device is arranged on a goods container, the first micromodule 46 is used to store information relating to the container itself for example, such as its date of commissioning, the owner's identity, the use-by date of the container (date on which it should be recycled), its empty weight, its maximum laden weight, etc. The second micromodule 46' is used to store information relating to the transport of the container for example, particularly the place of origin of the container, its final destination, the transit countries, etc. The third micromodule 46" is used to store information relating to the goods contained in the container for example, particularly their nature, their number, the identity of the consignees of the goods at the place of arrival of the container, and if need be, the particular conditions of storage of the goods (temperature, humidity). Finally, the fourth micromodule 46''' is used to store information relating to customs for example, particularly the value of the goods stored in the container, the unit cost of each good, etc.

In another application, the combination of the contactless integrated circuits is used to combine the data storage capacities provided by each integrated circuit, the storage capacity of a contactless integrated circuit of current production being generally quite low. For example, each integrated circuit comprises, in a part of its memory, a value representing the rank "i" of the integrated circuit relative to the other integrated circuits of the combination. Each integrated circuit offers a storage area MEMi to store data, wherein "i" is the rank assigned to the integrated circuit. All the integrated circuits therefore constitute a global memory MEM comprising the sum of the storage areas of increasing rank MEM1, MEM2, MEM3, MEM4 of each integrated circuit. The global memory may be used by a data send/receive station to read or log data of considerable length.

This embodiment relates both to the field of smart cards as well as electronic badges or electronic labels.

In yet another application, it is necessary to store in a single device medical data (electronic health record), data relating to the civil status of an individual (electronic identity card), data relating to the marital status of an individual (electronic family record), data relating to driving licenses for motor vehicles (electronic driving licence), etc.

Figure 9:
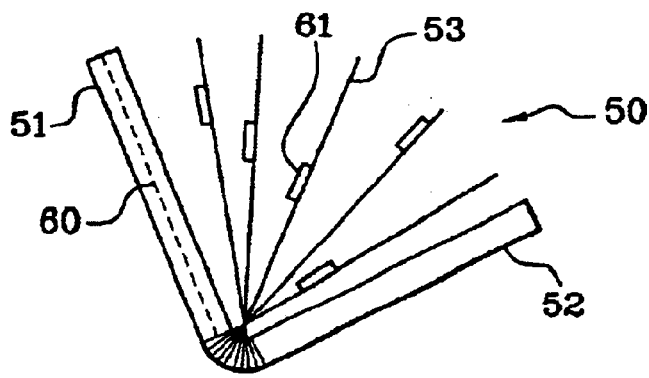
FIG. 9 represents, by a lateral view, a second example of an embodiment of a device according to the present invention.
Figure 10:
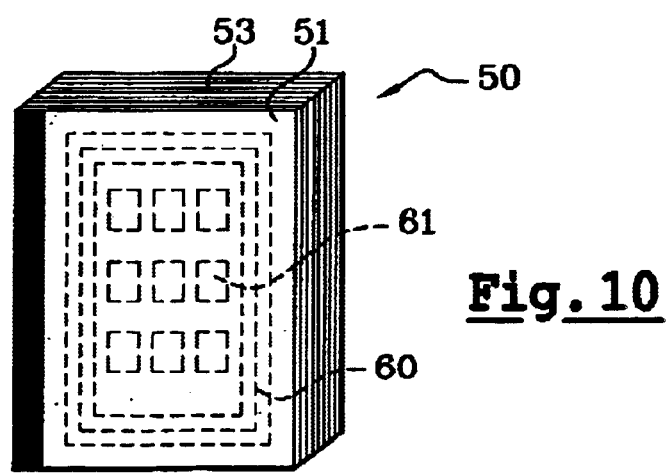
FIG. 10 is a front view of the device in FIG. 9.

A device 50 according to the present invention, provided for such an application, is illustrated in FIGS. 9 and 10. The device 50 looks like a notebook comprising a cover 51 and a back 52 made of cardboard or plastic, and "pages" 53. The cover 51 (or the back 52) incorporates a collective antenna 60 and each page receives or may receive one or more contactless electronic micromodules 61 of the type described above. In one embodiment, each page is a thin jacket made up of two plastic sheets, with one slot or several slots for the introduction of one or more micromodules 61. Each micromodule 61 takes the shape of a small plastic card incorporating a contactless integrated circuit and an individual antenna coil. In another embodiment, each micromodule 61 takes the shape of a silicon chip with integrated coil ("coil on chip") fixed onto a plastic sheet arranged in a notebook with rings, spirals or binding.

When the notebook 50 is closed, as illustrated in FIG. 10, each micromodule 61 is arranged according to an axis passing through the central part of the collective coil 51, that is to say the part externally demarcated by the smallest turn in diameter of the collective coil. Each micromodule 61 can therefore be read and/or written by means of a classical electronic label reader compatible with the anti-collision protocol implemented by the micromodules, by passing the reader in front of the cover 51.

Several other variations of production and applications of a device according to the present invention may of course be provided by those skilled in the art.

To complete the description above, an example of classical architecture of an integrated circuit that can be used to implement the present invention will be described below.

Example of classical architecture of a contactless integrated circuit

Figure 11:
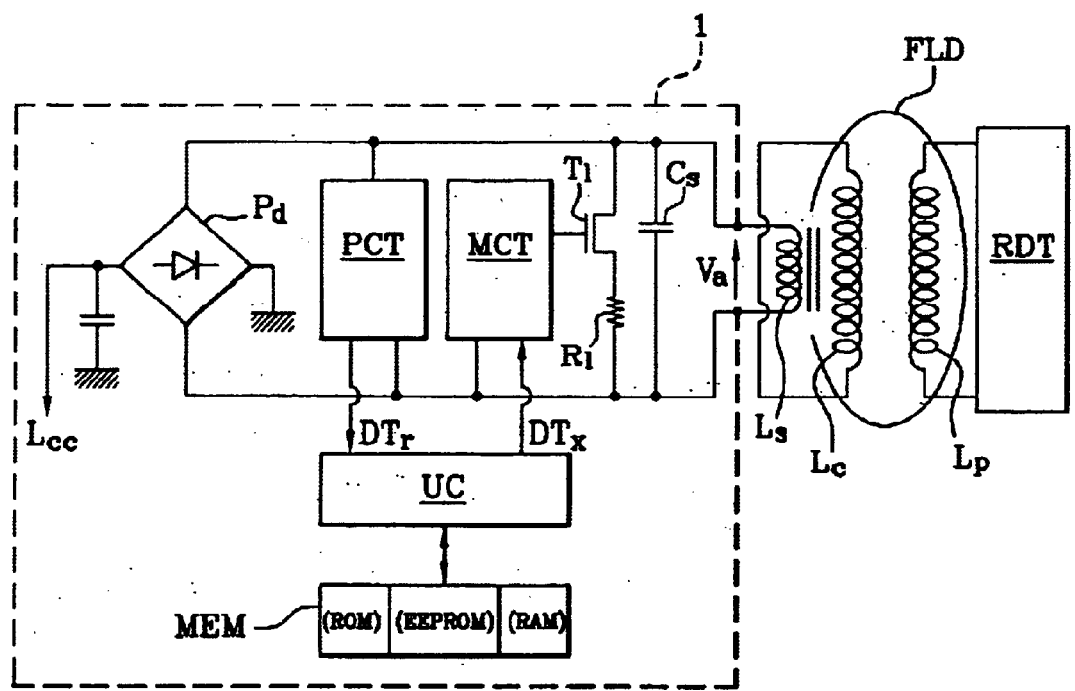
FIG. 11 is a diagram representing a classical architecture of a contactless integrated circuit.

FIG. 11 represents a classical example of architecture of an integrated circuit 1 operating without contact 1, connected to an individual antenna coil Ls which is itself coupled to a collective antenna coil Lc according to the present invention. The integrated circuit 1 comprises an internal capacitor Cs forming with the individual antenna coil Ls a resonant antenna circuit of LC type, as well as a bridge rectifier Pd with diodes, a demodulation circuit DCT connected to the terminals of the antenna circuit LsCs, a load modulation circuit MCT, a central processing unit UC with hard-wired logic or microprocessor, and a memory array MEM. The memory array MEM comprises a read-only memory (ROM), an electrically erasable and programmable read only memory (EEPROM) and a random access memory (RAM). The load modulation circuit MCT drives a load modulation transistor T1 which is connected to the terminals of the coil Ls through a load resistor R1.

When the coil Ls is located in the magnetic field FLD sent by the coil Lp of a label reader RDT (or data send/receive station), a magnetic field oscillating at 13.56 MHz for example, an induced alternating voltage Va amplified by the presence of the collective antenna Lc occurs at the terminals of the coil Ls. The voltage Va is rectified by the diode bridge Pd the output of which delivers a supply voltage Vcc of the integrated circuit. The data transmission from the reader RDT to the integrated circuit 1 is carried out by modulating the amplitude of the magnetic field FLD sent by the reader. The induced voltage Va is demodulated by the circuit DCT that delivers the data received DTr to the central processing unit UC. The data transmission from the integrated circuit 1 to the reader RDT is carried out by modulating the load of the antenna coil Ls, which is passed onto the antenna coil Lp of the reader RDT. This load modulation is carried out by the modulator circuit MCT, which applies, to the transistor T1, a load modulation signal that depends on the data DTx to be transmitted, provided by the central processing unit UC.

When the integrated circuit is activated by the field FLD after being in standby mode, the central processing unit UC begins by executing the steps of the anti-collision method chosen. The central processing unit UC waits for a general activation message to be received for example and determines upon receiving this message a random time for sending a response. If a message is received before the random time has elapsed, the central processing unit goes into standby mode while waiting for another general activation message.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A device (40, 50) comprising a combination of at least two contactless integrated circuits (1, 45, 61), each integrated circuit being connected to an individual antenna coil (46, Ls) to send and/or receive data by inductive coupling, characterised in that it comprises a collective antenna coil (42, 60, Lc) that is larger in size than the individual antenna coils of the integrated circuits, and means (41, 51, 53) for arranging the individual coil of an integrated circuit proximate to the collective coil, at least when data are to be read and/or written in the integrated circuit, so that the individual coil of the integrated circuit is inductively coupled to the collective coil, the integrated circuits (1, 45, 61) being arranged or programmed to implement an anti-collision protocol which enables a data send and/or receive station to select one, and only one, integrated circuit during communication with the device.

2. The device (40) according to claim 1, characterised in that the individual coil (46) of each integrated circuit (45) is permanently coupled to the collective coil (42).

3. The device according to claim 2, characterised in that the collective coil (42), the integrated circuits (45) and the individual antenna coils (46) are arranged on a common support (41), the integrated circuits and the individual antenna coils being placed in the centre of the collective coil (42).

4. The device (50) according to claim 1, characterised in that the collective coil (60) is arranged on a first support (51), the integrated circuits (61) are arranged on one or more supports (53) which are different from the first support, the device comprising means for moving the support (53) of an integrated circuit closer to the support (51) of the collective coil (60) at least when data are to be read and/or written in the integrated circuit.

5. The device according to claim 4, characterised in that the collective coil (60) and the integrated circuits (61) are arranged on substantially flat supports (51, 53) structured around an axis so as to form a sort of notebook (50).

6. The device according to claim 5, in which the flat supports are jackets (53).

7. The device according to claim 1, characterised in that each integrated circuit and its individual antenna coil are produced in the form of a small micromodule (20, 25, 30, 45).

8. The device (40) according to claim 1, characterised in that the integrated circuits (45) are arranged or programmed to form together an equivalent integrated circuit the global data storage capacity of which is greater than the individual storage capacity of each integrated circuit.

9. The device according to claim 8, characterised in that each integrated circuit (45) comprises a datum in its memory (MEM) representing the rank ("i") of the integrated circuit with regard to the other integrated circuits of the device, with a view to adding the data storage capacities of the integrated circuits by adding storage areas (MEMi).

* * * * *